United States Patent
Lu et al.

(10) Patent No.: US 8,552,577 B2
(45) Date of Patent: Oct. 8, 2013

(54) WIND-POWER GENERATION SYSTEM WITH OVER-SPEED PROTECTION AND METHOD OF OPERATING THE SAME

(75) Inventors: Yan-Song Lu, Shanghai (CN); Jun Chen, Shanghai (CN); Xue-Xiao Luo, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 39 days.

(21) Appl. No.: 13/466,493

(22) Filed: May 8, 2012

(65) Prior Publication Data

US 2013/0056985 A1 Mar. 7, 2013

(30) Foreign Application Priority Data

Sep. 7, 2011 (CN) .......................... 2011 1 0264283

(51) Int. Cl.
*F03D 9/00* (2006.01)
*H02P 9/04* (2006.01)

(52) U.S. Cl.
USPC .............................................. 290/44; 290/55

(58) Field of Classification Search
USPC ..................................................... 290/44, 55
See application file for complete search history.

(56) References Cited

U.S. PATENT DOCUMENTS

| | | | |
|---|---|---|---|
| 5,545,971 A * | 8/1996 | Gomez et al. .................. 323/259 |
| 5,708,574 A * | 1/1998 | Crompton ........................ 363/53 |
| 6,853,094 B2 * | 2/2005 | Feddersen et al. .............. 290/44 |
| 6,856,040 B2 * | 2/2005 | Feddersen et al. .............. 290/44 |
| 6,856,041 B2 * | 2/2005 | Siebenthaler et al. .......... 290/44 |
| 6,933,625 B2 * | 8/2005 | Feddersen et al. .............. 290/44 |
| 7,015,595 B2 * | 3/2006 | Feddersen et al. .............. 290/44 |
| 7,425,771 B2 * | 9/2008 | Rivas et al. ...................... 290/44 |
| 7,518,256 B2 * | 4/2009 | Juanarena Saragueta et al. ............................... 290/44 |
| 7,586,216 B2 * | 9/2009 | Li et al. ........................ 307/151 |
| 7,710,087 B2 * | 5/2010 | Tan et al. ...................... 323/272 |
| 7,944,089 B2 * | 5/2011 | Lu et al. ........................... 307/66 |
| 8,129,851 B2 * | 3/2012 | Ichinose et al. ................. 290/44 |
| 8,143,743 B2 * | 3/2012 | Lu et al. ........................... 307/64 |
| 8,183,704 B2 * | 5/2012 | Rivas et al. ...................... 290/44 |
| 8,207,623 B2 * | 6/2012 | Rivas et al. ...................... 290/44 |
| 8,264,094 B2 * | 9/2012 | Rivas et al. ...................... 290/44 |
| 8,294,288 B2 * | 10/2012 | Rivas et al. ...................... 290/44 |
| 8,299,642 B2 * | 10/2012 | Ichinose et al. ................. 290/44 |
| 2003/0151259 A1 * | 8/2003 | Feddersen et al. .............. 290/44 |
| 2004/0217594 A1 * | 11/2004 | Feddersen et al. .............. 290/44 |
| 2004/0217595 A1 * | 11/2004 | Feddersen et al. .............. 290/44 |

(Continued)

FOREIGN PATENT DOCUMENTS

CN 101087122 A 12/2007

*Primary Examiner* — Pedro J Cuevas
(74) *Attorney, Agent, or Firm* — Chun-Ming Shih; HDLS IPR Services (57) ABSTRACT

A wind-power generation system with an over-speed protection is disclosed. The system is provided to convert wind energy into mechanical energy by a wind turbine, and mechanical energy is converted into electric energy by the wind turbine driving a generator. Also, electric energy is delivered to a power grid. The wind-power generation system mainly includes an AC crowbar, a fuse, and a DC chopper. The AC crowbar or the DC chopper is provided to consume superfluous energy outputted from the generator, thus providing an over-load operation to brake the wind turbine when the wind turbine operates under a first stage over-speed operation. Finally, the generator is isolated from the generator-side converter by disconnecting the fuse when the wind turbine operates under a second stage over-speed operation.

7 Claims, 6 Drawing Sheets

(56) References Cited

U.S. PATENT DOCUMENTS

| | | | |
|---|---|---|---|
| 2004/0217596 A1* | 11/2004 | Feddersen et al. | 290/44 |
| 2004/0222642 A1* | 11/2004 | Siebenthaler et al. | 290/44 |
| 2007/0216164 A1* | 9/2007 | Rivas et al. | 290/44 |
| 2007/0246943 A1* | 10/2007 | Chang et al. | 290/44 |
| 2007/0279815 A1* | 12/2007 | Li et al. | 361/54 |
| 2008/0012426 A1* | 1/2008 | Lu et al. | 307/65 |
| 2008/0049474 A1* | 2/2008 | Tan et al. | 363/123 |
| 2008/0304188 A1* | 12/2008 | Ichinose et al. | 361/20 |
| 2009/0008937 A1* | 1/2009 | Erdman et al. | 290/44 |
| 2009/0167095 A1* | 7/2009 | Rivas et al. | 307/87 |
| 2009/0184583 A1* | 7/2009 | Lu et al. | 307/66 |
| 2009/0278351 A1* | 11/2009 | Rivas et al. | 290/44 |
| 2009/0278352 A1* | 11/2009 | Rivas et al. | 290/44 |
| 2010/0201330 A1* | 8/2010 | Ichinose et al. | 322/61 |
| 2010/0308658 A1* | 12/2010 | Lu et al. | 307/64 |
| 2011/0025059 A1* | 2/2011 | Helle et al. | 290/44 |
| 2011/0057443 A1* | 3/2011 | Rivas et al. | 290/44 |
| 2013/0038061 A1* | 2/2013 | Rivas et al. | 290/44 |
| 2013/0049707 A1* | 2/2013 | Wang et al. | 322/21 |
| 2013/0076336 A1* | 3/2013 | Cao et al. | 324/72 |
| 2013/0182465 A1* | 7/2013 | Wang et al. | 363/34 |
| 2013/0182466 A1* | 7/2013 | Lu et al. | 363/34 |
| 2013/0193933 A1* | 8/2013 | Andresen et al. | 322/23 |

* cited by examiner

WIND-POWER GENERATION SYSTEM WITH OVER-SPEED PROTECTION AND METHOD OF OPERATING THE SAME

BACKGROUND OF THE INVENTION

1. Field of the Invention

The present invention relates generally to a wind-power generation system and a method of operating the same, and more particularly to a wind-power generation system with an over-speed protection and a method of operating the same.

2. Description of Prior Art

For the most popular wind-power generation system at present, an inverter is usually used to provide electric energy with fixed frequency from the generation system to a power grid. Because the used equipment and electric machinery are often more expensive and difficult to be replaced in a large-scale wind-power generation system, the reliability of the generation system and the inverter becomes more important. In addition, the large-scale wind-power generation system is usually used in bad climatic and environmental conditions, such as a desert region or a coastal region. In these climatic and environmental conditions, changes in wind direction and wind speed are violent and frequent and even storms and typhoons often occur. Accordingly, the wind-power generation system is easily operated under an over-speed condition so that the system is easily damaged due to the generated too-high voltage.

Figure 1:
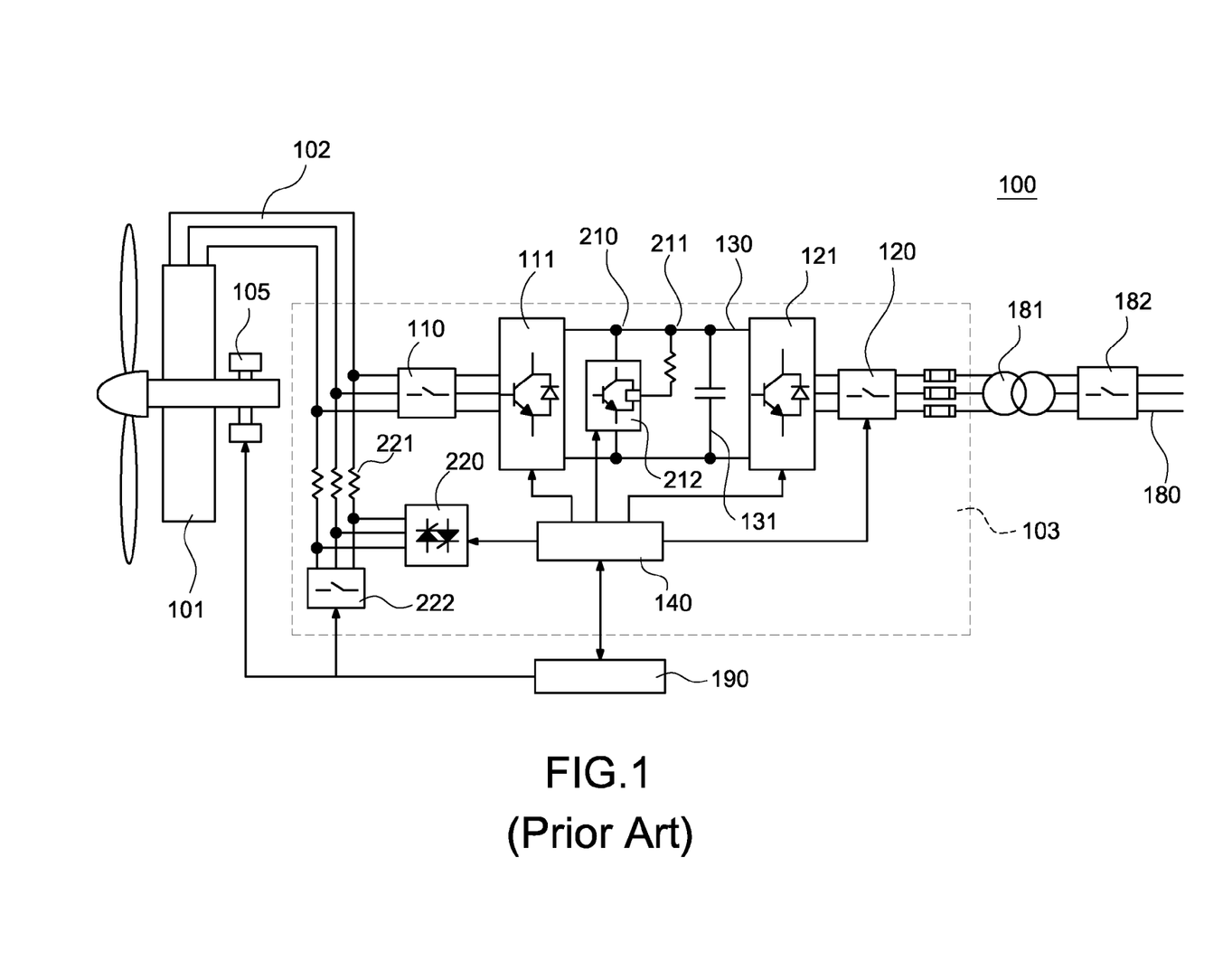
FIG. 1 is a circuit block diagram of a prior art redundant electrical brake and protection system for electric generators.

Reference is made to FIG. 1 which is a circuit block diagram of a prior art redundant electrical brake and protection system for electric generators. The prior art redundant electrical brake and protection system for electric generators is published with a publication number (CN101087122A) by State Intellectual Property Office (SIPO). The redundant protection system includes a system wherein two energy dissipation paths are consolidated. One path includes the generator side converter 111; the other path includes the dump load resistor 221. The generator side converter 111 can also be designed to accommodate up to rated output power rating for the generator 101, while the dump load resistor 221 is sized to provide the additional needed braking power.

The wind turbine control unit 190 makes a determination regarding availability of the generator side converter 111. If the generator side converter 111 is not available, the wind turbine control unit 190 provides for engaging the braker unit 105. If the generator side converter 111 is available, a determination is made by the converter control unit 140 regarding the required amount of braking power. If the required braking power is less than the rated output power of the generator 101, the converter control unit 140 provides for dissipating power in the generator side converter 111. If the required braking power is greater than the rated output power of the generator 101, the dump load resistor 221 is operated.

Accordingly, it is desirable to provide a wind-power generation system with an over-speed protection and a method of operating the same to provide an AC crowbar or a DC chopper to consume superfluous energy outputted from the generator, thus providing an over-load operation to brake the wind turbine when the wind turbine operates under an abnormal speed; even a fuse is disconnected to isolate the generator.

SUMMARY OF THE INVENTION

An object of the invention is to provide a wind-power generation system with an over-speed protection to solve the above-mentioned problems.

The wind-power generation system with an over-speed protection provides a wind turbine to convert wind energy into mechanical energy, the wind turbine drives a generator to convert mechanical energy into an electric energy, and the electric energy is delivered to a power grid to provide a grid connection between the wind-power generation system and the power grid. The wind-power generation system includes an AC crowbar, a fuse, a generator-side converter, a DC chopper, a grid-side converter, a grid-connected filter, and a transformer.

The AC crowbar is electrically connected to the generator. The fuse is electrically connected to the AC crowbar and the generator. The generator-side converter is electrically connected to the fuse to provide an AC-to-DC conversion of electric energy. The DC chopper is electrically connected to the generator-side converter. The grid-side converter is electrically connected to the DC shopper to provide a DC-to-AC conversion of electric energy. The grid-connected filter is electrically connected to the grid-side converter to filter electric energy. The transformer is electrically connected to the grid-connected filter and the power grid to convert a voltage level of the electric energy of the grid connection between the wind-power generation system and the power grid.

The AC crowbar or the DC chopper is provided to consume superfluous energy outputted from the generator, thus providing an over-load operation to brake the wind turbine when the wind turbine operates under a first stage over-speed operation; the generator is isolated from the generator-side converter by disconnecting the fuse when the wind turbine operates under a second stage over-speed operation.

Another object of the invention is to provide a method of operating the wind-power generation system with an over-speed protection, steps of operating the wind-power generation system include: the AC crowbar or the DC chopper is provided to consume superfluous energy outputted from the generator, thus providing an over-load operation to brake the wind turbine when the wind turbine operates under a first stage over-speed operation; the generator is isolated from the generator-side converter by disconnecting the fuse when the wind turbine operates under a second stage over-speed operation.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Reference will now be made to the drawing figures to describe the present invention in detail.

Figure 2:
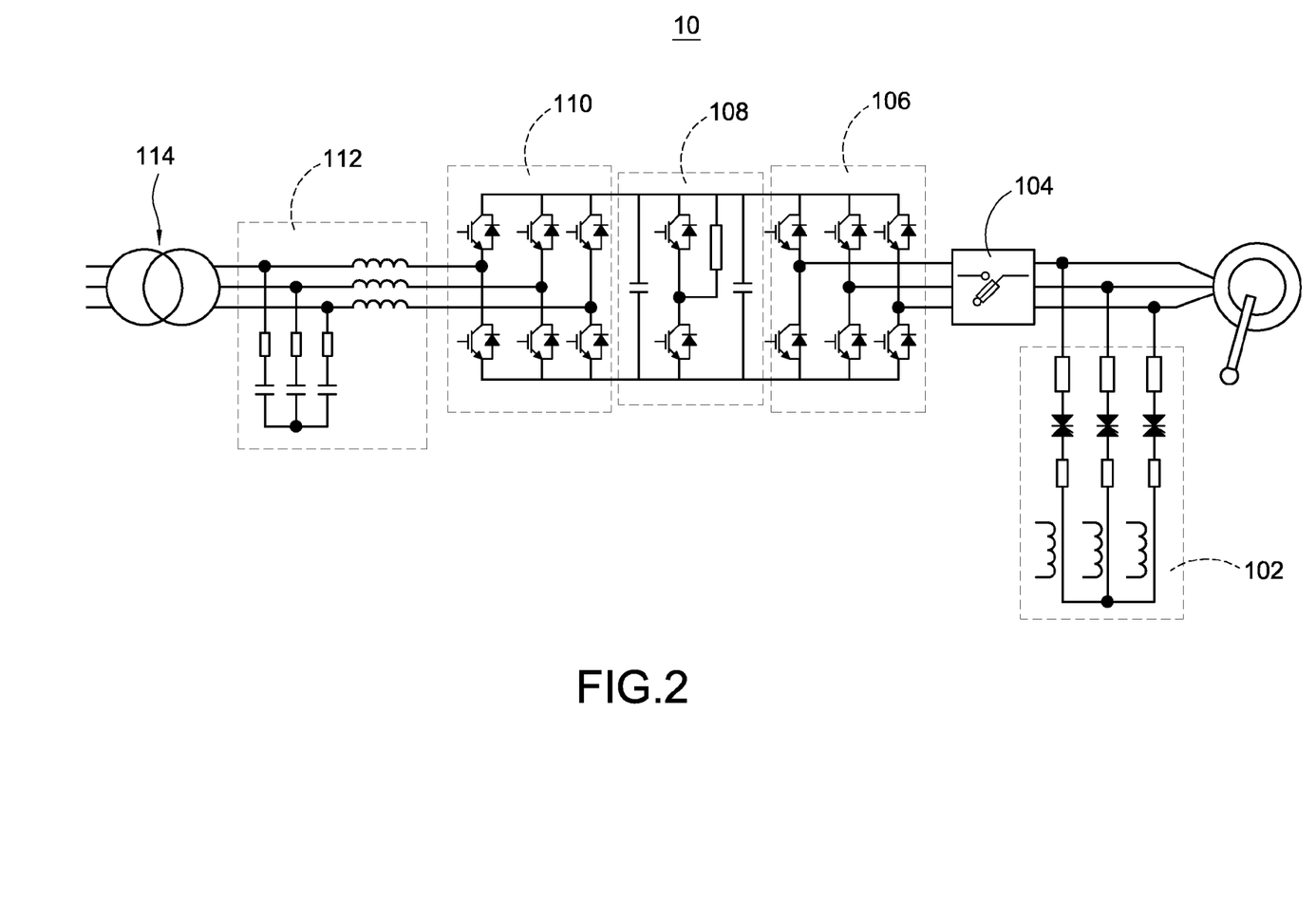
FIG. 2 is a circuit block diagram of a wind-power generation system with an over-speed protection according to the present invention.

Reference is made to FIG. 2 which is a circuit block diagram of a wind-power generation system with an over-speed protection according to the present invention. Note that, the wind-power generation system 10 is a full-power converter wind power system. The wind-power generation system 10 provides a wind turbine (now shown) to convert wind energy into mechanical energy and then the wind turbine drives a generator (not labeled) to convert the mechanical energy into an electric energy. Also, the electric energy is delivered to a power grid (not shown) so that the wind-power generation system 10 is grid-connected to the power grid. In an embodiment, the generator can be a permanent-magnet synchronous generator, but not limited. The wind-power generation system 10 includes an AC crowbar 102, a fuse 104, a generator-side converter 106, a DC chopper 108, a grid-side converter 110, a grid-connected filter 112, and a transformer 114.

The AC crowbar 102 is electrically connected to the generator. The fuse 104 is electrically connected to the AC crowbar 102 and the generator. The generator-side converter 106 is electrically connected to the fuse 104 to provide an AC-to-DC conversion of the electric energy. Essentially, the generator-side converter 106 is an AC-to-DC converter. The DC chopper 108 is electrically connected to the generator-side converter 106. Essentially, the DC chopper 108 is a DC-to-DC converter. The grid-side converter 110 is electrically connected to the DC chopper 108 to provide a DC-to-AC conversion of electric energy. Essentially, the grid-side converter 110 is a DC-to-AC converter. The grid-connected filter 112 is electrically connected to the grid-side converter 110 to filter the electric energy. The transformer 114 is electrically connected to the grid-connected filter 112 and the power grid to convert a voltage level of the grid-connected electric energy between the wind-power generation system and the power grid.

The AC crowbar 102 is provided to consume superfluous energy outputted from the generator, thus providing an over-load operation to brake the wind turbine when the wind turbine operates under a first stage over-speed operation. In an embodiment, the first stage over-speed operation is defined that a speed of the wind turbine is greater than a rated speed thereof, but not limited. Also, the speed of the wind turbine under the first stage over-speed operation can be adjusted according to parameters of various wind turbines produced by the wind turbine manufacturers. Afterward, the DC chopper 108 is provided to consume superfluous energy outputted from the generator, thus providing an over-load operation to brake the wind turbine if the wind turbine still operates under the first stage over-speed operation. Afterward, an invalid protection for the first stage over-speed operation is determined that superfluous energy outputted from the generator cannot be consumed and the wind turbine still operates under the over-load condition after the AC crowbar 102 and the DC chopper 108 are both provided. When the wind turbine operates under a second stage over-speed operation after the invalid protection for the first stage over-speed operation, the generator is isolated from the generator-side converter 106 by disconnecting the fuse 104. In an embodiment, the second stage over-speed operation is defined that a speed of the wind turbine is greater than a rated speed thereof by more than 10%, but not limited. Also, the speed of the wind turbine under the second stage over-speed operation can be adjusted according to parameters of various wind turbines produced by the wind turbine manufacturers. Hence, the fuse 104 is forcibly and devastatingly disconnected to isolate the generator from the generator-side converter 106 when the wind turbine operates under the second stage over-speed operation. Accordingly, the electric energy generated from the generator cannot be provided to the power grid, thus avoiding an abnormal power supply of the wind-power generation system 10 due to the over-speed operation.

Figure 6:
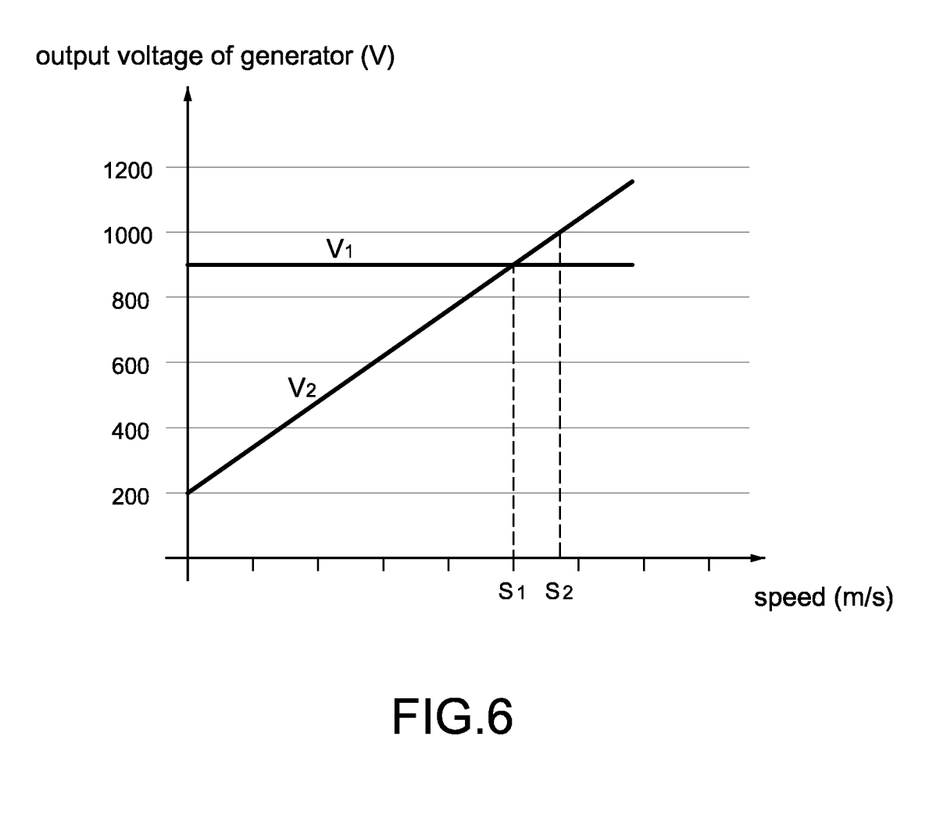
FIG. 6 is a schematic view of showing a relationship between speed and output voltage of a generator according to the present invention.

Reference is made to FIG. 6 which is a schematic view of showing a relationship between speed and output voltage of a generator according to the present invention. Two major voltage curves—a threshold voltage V1 and a no-load voltage V2, are illustrated in the schematic view. Note that, the threshold voltage V1 represents that an output voltage of the generator reaches to a safe limitation; the no-load voltage V2 represents that an output voltage of the generator under a no-load operation. In the embodiment, the first stage over-speed operation is indicated that the speed of the wind turbine is greater than a first speed S1; wherein the first speed S1 is defined as a speed of the wind turbine when the no-load voltage V2 of the generator is equal to the threshold voltage V1 thereof. In addition, the second stage over-speed operation is indicated that the speed of the wind turbine is greater than a second speed S2. Preferably, the second speed S2 is defined that a speed of the wind turbine is greater than a rated speed thereof by more than 10%, but not limited. Also, the speed of the wind turbine under the second stage over-speed operation can be adjusted according to parameters of various wind turbines produced by the wind turbine manufacturers.

Before the wind turbine operates under the first stage over-speed operation, that is, when an abnormal acceleration of the wind turbine is detected, the blade angle of the wind turbine can be adjusted to reduce the received wind energy by the wind turbine, thus reducing the speed of the wind turbine to a normal speed.

Accordingly, the three above-mentioned ways can be implemented to reduce speed of the wind turbine before the wind turbine operates under the second stage over-speed operation:

1. The blade angle of the wind turbine is adjusted; 2. The AC crowbar 102 is provided; and 3. The DC chopper 108 is provided.

Note that, the above-mentioned ways are not limited to be used in turn or in all. The sequence and the type of the three ways are adopted according to the practical operation of the wind turbine or the experience of the operators.

Figure 3:
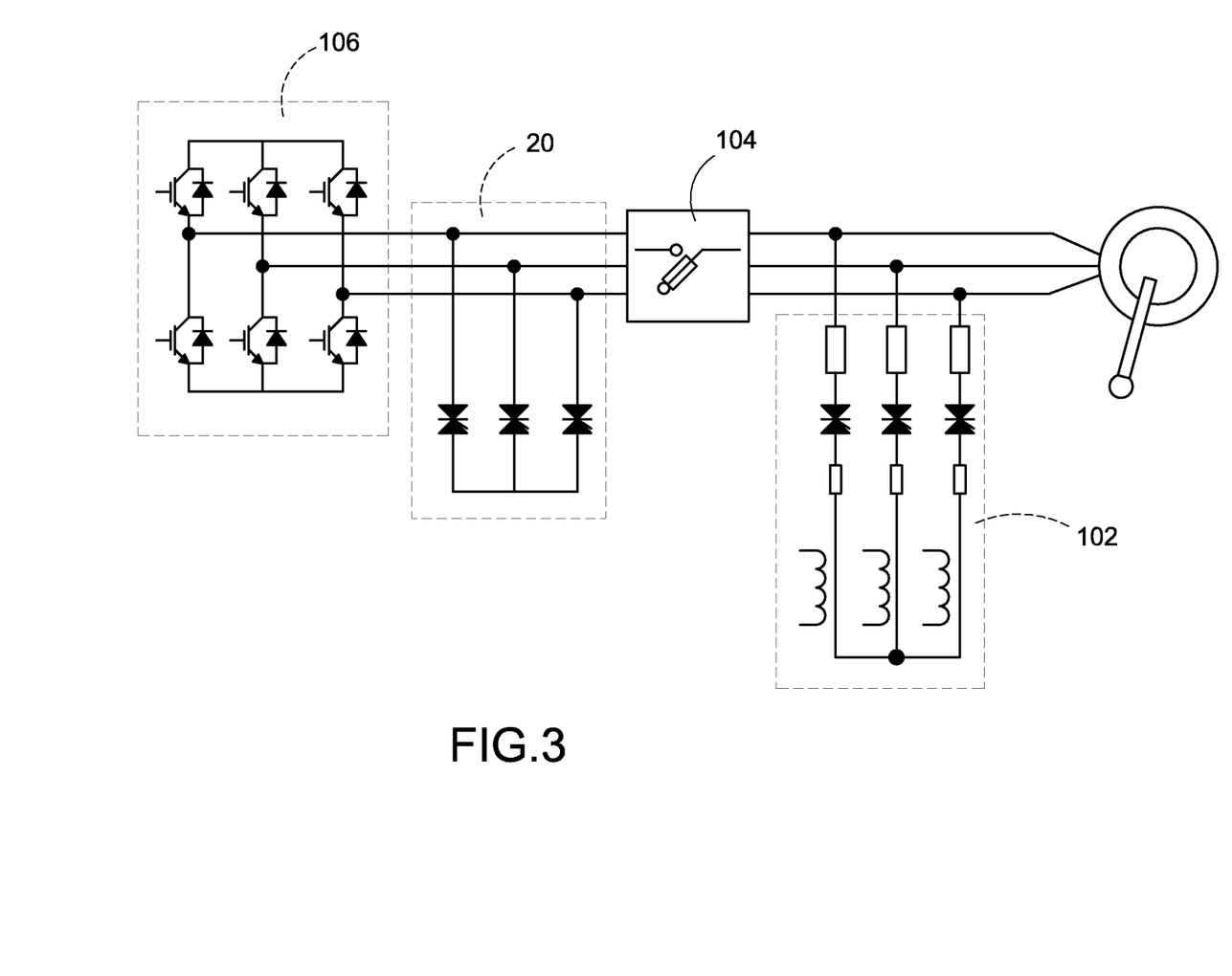
FIG. 3 is a circuit block diagram of using a three-phase controllable rectification circuit to achieve a disconnection of a fuse according to the present invention.
Figure 4:
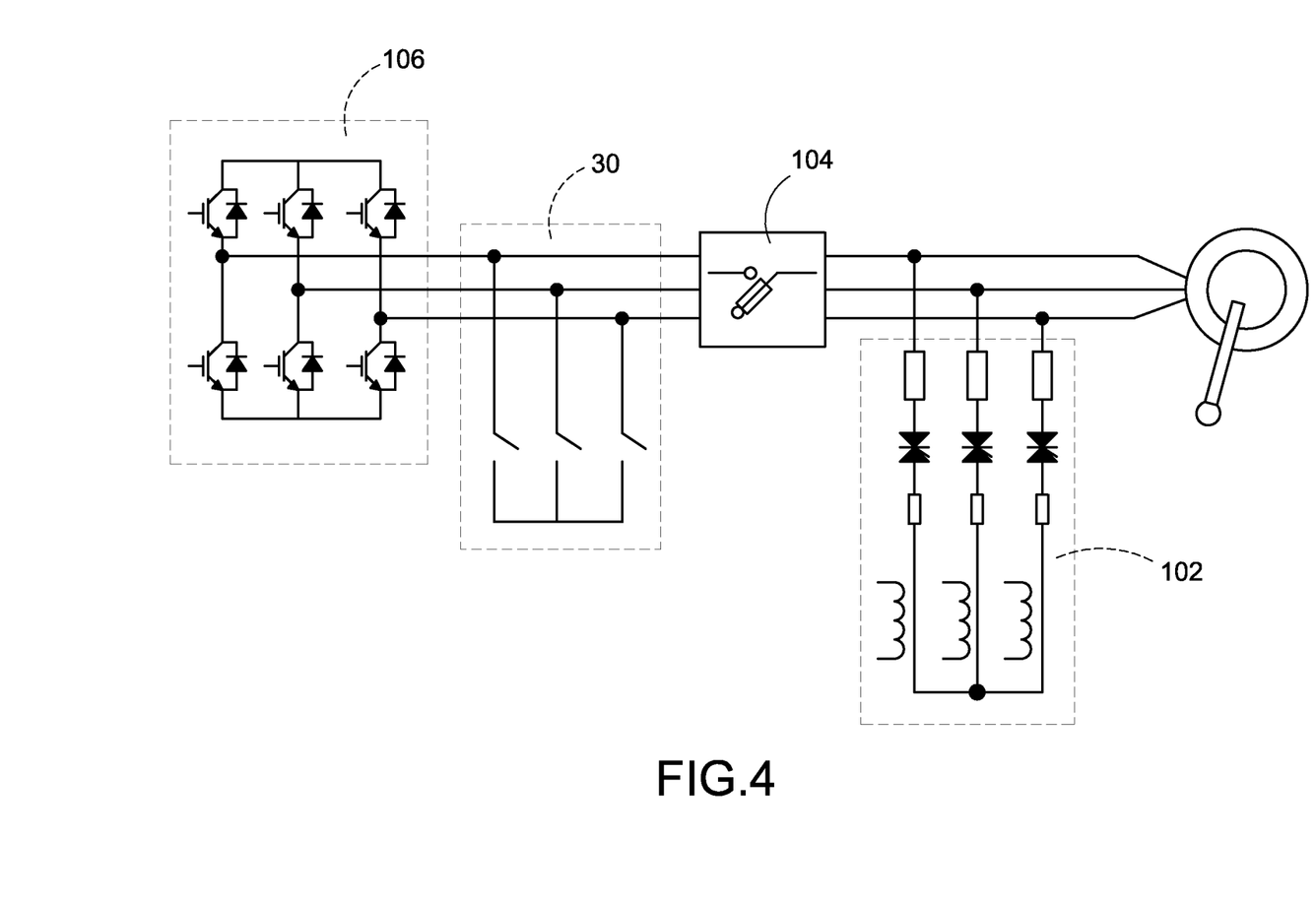
FIG. 4 is a circuit block diagram of using a three-phase short-circuit contactor to achieve a disconnection of a fuse according to the present invention.

Especially to deserve to be mentioned, the three ways of isolating the generator-side converter 106 by disconnecting the fuse 104 when the wind turbine operates under the second stage over-speed operation are described as follows:

1. By turning on switches of an upper-bridge arm and switches of a lower-bridge arm of the generator-side converter 106 simultaneously to disconnect the fuse 104;

2. By shorting the three-phase controllable rectification circuit 20 out to disconnect the fuse 104 (as shown in FIG. 3); and 3. By shorting the three-phase short-circuit contactor 30 out to disconnect the fuse 104 (as shown in FIG. 4).

Various substitutions and modification of disconnecting the fuse 104 are intended to be embraced within the scope of the invention, but the above-mentioned ways are not limited.

Figure 5:
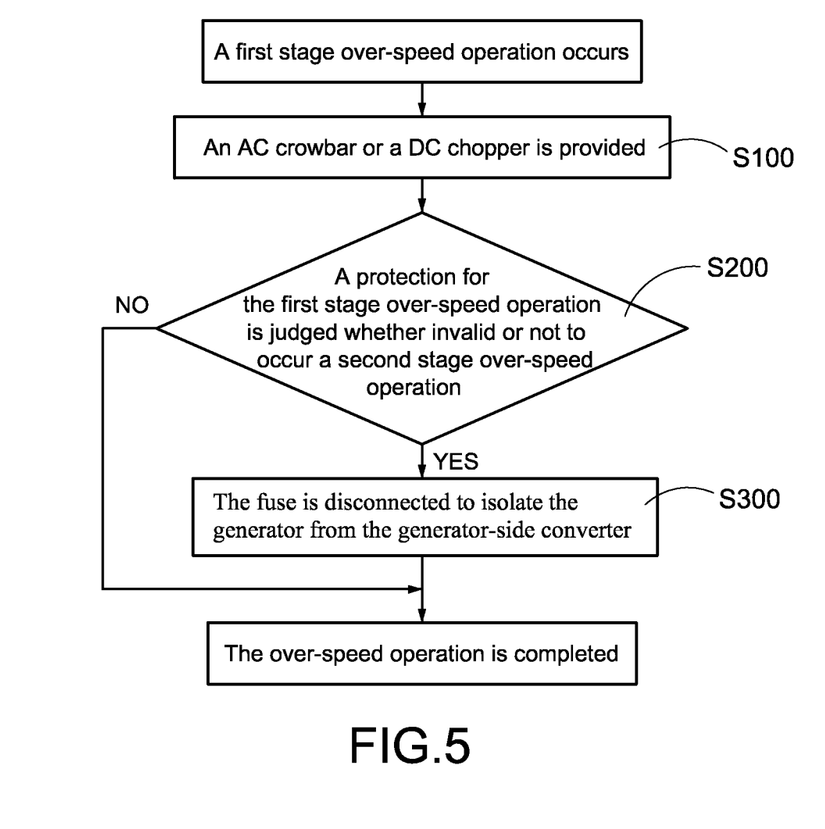
FIG. 5 is a flowchart of a method of operating a wind-power generation system with an over-speed protection according to the present invention.

Reference is made to FIG. 5 which is a flowchart of a method of operating a wind-power generation system with an over-speed protection according to the present invention. Note that, the wind-power generation system is a full-power converter wind power system, but not limited. The wind-power generation system provides a wind turbine to convert wind energy into mechanical energy and then the wind turbine drives a generator to convert the mechanical energy into electric energy. Also, the electric energy is delivered to a power grid so that the wind-power generation system is grid-connected to the power grid. In an embodiment, the generator can be a permanent-magnet synchronous generator, but not limited. The wind-power generation system 10 includes an AC crowbar, a fuse, a generator-side converter, a DC chopper, a grid-side converter, a grid-connected filter, and a transformer.

The AC crowbar is electrically connected to the generator. The fuse is electrically connected to the AC crowbar and the generator. The generator-side converter is electrically connected to the fuse to provide an AC-to-DC conversion of electric energy. Essentially, the generator-side converter is an AC-to-DC converter. The DC chopper is electrically connected to the generator-side converter. Essentially, the DC chopper is a DC-to-DC converter. The grid-side converter is electrically connected to the DC chopper to provide a DC-to-AC conversion of electric energy. Essentially, the grid-side converter is a DC-to-AC converter. The grid-connected filter is electrically connected to the grid-side converter to filter the electric energy. The transformer is electrically connected to the grid-connected filter and the power grid to convert a voltage level of the electric energy of the grid connection between the wind-power generation system and the power grid.

A method of operating the wind-power generation system with an over-speed protection includes the following steps: First, an AC crowbar or a DC chopper is provided (S100) to consume superfluous energy outputted from the generator, thus providing an over-load operation to brake the wind turbine when the wind turbine operates under a first stage over-speed operation. In particular, the first stage over-speed operation is defined that a speed of the wind turbine is greater than a rated speed thereof, but not limited. Afterward, a protection for the first stage over-speed operation is judged whether invalid or not to occur a second stage over-speed operation (S200). In an embodiment, the second stage over-speed operation is defined that a speed of the wind turbine is greater than a rated speed thereof by more than 10%, but not limited. Also, the speed of the wind turbine under the second stage over-speed operation can be adjusted according to parameters of various wind turbines produced by the wind turbine manufacturers. If the protection for the first stage over-speed operation is valid, namely, the second stage over-speed operation does not occur, the over-speed operation is completed. On the other hand, if the second stage over-speed operation occurs, the fuse is disconnected to isolate the generator from the generator-side converter (S300). That is, the second stage over-speed operation still occurs due to the increased speed of the wind turbine after the AC crowbar and the DC chopper are both provided, the fuse is disconnected to isolate the generator from the generator-side converter. Hence, the fuse is forcibly and devastatingly disconnected to isolate the generator from the generator-side converter when the wind turbine operates under the second stage over-speed operation. Accordingly, the electric energy generated from the generator cannot be provided to the power grid, thus avoiding an abnormal power supply of the wind-power generation system due to the over-speed operation.

Before the wind turbine operates under the first stage over-speed operation, that is, when an abnormal acceleration of the wind turbine is detected, the blade angle of the wind turbine can be adjusted to reduce the received wind energy by the wind turbine, thus reducing the speed of the wind turbine to a normal speed.

Accordingly, the three above-mentioned ways can be implemented to reduce speed of the wind turbine before the wind turbine operates under the second stage over-speed operation:

1. The blade angle of the wind turbine is adjusted; 2. The AC crowbar 102 is provided; and 3. The DC chopper 108 is provided.

Note that, the above-mentioned ways are not limited to be used in turn or in all. The sequence and the type of the three ways are adopted according to the practical operation of the wind turbine or the experience of the operators.

Especially to deserve to be mentioned, the three ways of isolating the generator-side converter by disconnecting the fuse when the wind turbine operates under the second stage over-speed operation are described as follows:

1. By turning on switches of an upper-bridge arm and switches of a lower-bridge arm simultaneously to disconnect the fuse;

2. By shorting the three-phase controllable rectification circuit out to disconnect the fuse (as shown in FIG. 3); and 3. By shorting the three-phase short-circuit contactor out to disconnect the fuse (as shown in FIG. 4).

Various substitutions and modification of disconnecting the fuse are intended to be embraced within the scope of the invention, but the above-mentioned ways are not limited.

In conclusion, the present invention has following advantages:

1. Before the wind turbine operates under the first stage over-speed operation, that is, when an abnormal acceleration of the wind turbine is detected, the blade angle of the wind turbine can be adjusted to reduce the received wind energy by the wind turbine, thus reducing the speed of the wind turbine to a normal speed. When the wind turbine operates under the first stage over-speed operation, the AC crowbar or the DC chopper is provided to consume superfluous energy outputted from the generator, thus providing an over-load operation to brake the wind turbine. When the wind turbine operates under the second stage over-speed operation, the fuse is forcibly and devastatingly disconnected by turning on switches of the upper-bridge arm and switches of the lower-bridge arm simultaneously, shorting the three-phase controllable rectification circuit out, or shorting the three-phase short-circuit contactor out, thus reducing the speed of the wind turbine to a normal speed; and 2. When the wind turbine is operated under a routine inspection or maintain, the fuse is disconnected to prevent the maintenance personnel from injury or death due to the induced voltage generated from the generator of rotating during the inspection or maintain.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A wind-power generation system with an over-speed protection providing a wind turbine to convert wind energy into mechanical energy, the wind turbine driving a generator to convert the mechanical energy into electric energy, the electric energy delivered to a power grid to provide a grid connection between the wind-power generation system and the power grid; the wind-power generation system comprising:

an AC crowbar electrically connected to the generator;
a fuse electrically connected to the AC crowbar and the generator;
a generator-side converter electrically connected to the fuse to provide an AC-to-DC conversion of electric energy;
a DC chopper electrically connected to the generator-side converter;
a grid-side converter electrically connected to the DC chopper to provide a DC-to-AC conversion of electric energy;
a grid-connected filter electrically connected to the grid-side converter to filter electric energy; and
a transformer electrically connected to the grid-connected filter and the power grid to convert a voltage level of the electric energy of the grid connection between the wind-power generation system and the power grid;
wherein the AC crowbar or the DC chopper is provided to consume superfluous energy outputted from the generator, thus providing an over-load operation to brake the wind turbine when the wind turbine operates under a first stage over-speed operation; the generator is isolated from the generator-side converter by disconnecting the fuse when the wind turbine operates under a second stage over-speed operation.

2. The wind-power generation system of claim 1, wherein the fuse is disconnected by turning on switches of an upper-bridge arm and switches of a lower-bridge arm of the generator-side converter.

3. The wind-power generation system of claim 1, wherein the wind-power generation system further comprises a controllable rectification circuit, the controllable rectification circuit is electrically connected to the fuse and the generator-side converter.

4. The wind-power generation system of claim 3, wherein the fuse is disconnected by shorting the three-phase controllable rectification circuit out.

5. The wind-power generation system of claim 1, wherein the wind-power generation system further comprises a three-phase short-circuit contactor, the three-phase short-circuit contactor is electrically connected to the fuse and the generator-side converter.

6. The wind-power generation system of claim 5, wherein the fuse is disconnected by shorting the three-phase short-circuit contactor.

7. A method of operating the wind-power generation system with an over-speed protection of claim 1, steps of operating the wind-power generation system comprising:
(a) providing the AC crowbar or the DC chopper to consume superfluous energy outputted from the generator, thus providing an over-load operation to brake the wind turbine when the wind turbine operates under a first stage over-speed operation; and
(b) isolating the generator from the generator-side converter by disconnecting the fuse when the wind turbine operates under a second stage over-speed operation.

* * * * *